United States Patent
Qiao et al.

(10) Patent No.: US 11,956,682 B2
(45) Date of Patent: Apr. 9, 2024

(54) HANDOVER METHOD AND APPARATUS

(71) Applicant: HUAWEI TECHNOLOGIES CO., LTD., Guangdong (CN)

(72) Inventors: Yunfei Qiao, Hangzhou (CN); Meixin Lin, Hangzhou (CN); Xian Meng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 17/543,110

(22) Filed: Dec. 6, 2021

(65) Prior Publication Data
US 2022/0095179 A1   Mar. 24, 2022

Related U.S. Application Data

(63) Continuation of application No. PCT/CN2020/094267, filed on Jun. 4, 2020.

(30) Foreign Application Priority Data

Jun. 6, 2019 (CN) .......................... 201910492708.6

(51) Int. Cl.
*H04W 36/00* (2009.01)
*H04B 7/185* (2006.01)
*H04W 84/06* (2009.01)

(52) U.S. Cl.
CPC .... *H04W 36/0077* (2013.01); *H04B 7/18541* (2013.01); *H04W 36/0033* (2013.01); *H04W 36/0058* (2018.08); *H04W 84/06* (2013.01)

(58) Field of Classification Search
CPC ......... H04W 36/0077; H04W 36/0033; H04W 36/0058; H04W 84/06; H04W 36/32;
(Continued)

(56) References Cited

U.S. PATENT DOCUMENTS

2017/0367019 A1* 12/2017 Schultz ................ H04W 36/08
2019/0082481 A1*  3/2019 Ravishankar ......... H04W 76/10
(Continued)

FOREIGN PATENT DOCUMENTS

CN       1859791 A    11/2006
CN     103945471 A     7/2014
(Continued)

OTHER PUBLICATIONS

Office Action issued in Chinese Application No. 201910492708.6 dated Mar. 25, 2021, 10 pages (with English translation).
(Continued)

*Primary Examiner* — Ashley Shivers
(74) *Attorney, Agent, or Firm* — Fish & Richardson P.C.

(57) ABSTRACT

A handover method and apparatus are disclosed. In some implementations, the method includes: determining a part of terminal devices to be handed over in a plurality of terminal devices in a staring area of a first beam; sending a first handover request message to a target satellite, where the first handover request message includes contexts of the part of terminal devices; and receiving a handover instruction sent by the target satellite based on the first handover request message, and sending the handover instruction to the part of terminal devices by using the first beam. The handover instruction includes handover parameters used for handing over the part of terminal devices. According to some implementations, the part of terminal devices in the plurality of terminal devices in the staring area may be handed over, so that a signaling storm can be avoided and communication performance can be improved.

20 Claims, 7 Drawing Sheets

(58) Field of Classification Search
CPC ........... H04W 36/0009; H04B 7/18541; H04B 7/185; H04B 7/18513; H04B 7/18519; H04B 7/18521
See application file for complete search history.

(56) References Cited

U.S. PATENT DOCUMENTS

2019/0230568 A1* 7/2019 Arur ................. H04B 7/2041
2019/0253952 A1* 8/2019 Kumar ............... H04W 68/005

FOREIGN PATENT DOCUMENTS

| CN | 105682111 A | 6/2016 |
|---|---|---|
| CN | 107380485 A | 11/2017 |
| CN | 107852230 A | 3/2018 |
| CN | 108051808 A | 5/2018 |
| CN | 108112281 A | 6/2018 |
| CN | 110072264 A | 7/2019 |
| CN | 110221318 A | 9/2019 |
| CN | 110809292 A | 2/2020 |
| EP | 1050978 A2 | 11/2000 |
| JP | 2000315972 A | 11/2000 |
| WO | 2017139067 A1 | 8/2017 |

OTHER PUBLICATIONS

PCT International Search Report and Written Opinion issued in International Application No. PCT/CN2020/094267 dated Aug. 21, 2020, 18 pages (with English translation).

* cited by examiner

HANDOVER METHOD AND APPARATUS

CROSS-REFERENCE TO RELATED APPLICATIONS

This application is a continuation of International Patent Application No. PCT/CN2020/094267, filed on Jun. 4, 2020, which claims priority to Chinese Patent Application No. 201910492708.6, filed on Jun. 6, 2019. The disclosures of the aforementioned applications are hereby incorporated by reference in their entireties.

TECHNICAL FIELD

This application relates to the satellite communications field, and more specifically, to a handover method and a handover apparatus in the satellite communications field.

BACKGROUND

Satellites play an irreplaceable role in some important fields, such as space communication, aeronautical communication, maritime communication and military communication. Satellite communication has advantages such as a long communication distance, a large coverage area, and flexible networking, and satellites can provide services for both fixed terminal devices and mobile terminals.

In satellite communication, based on altitudes of orbits in which the satellites are located, the satellites may be classified into a geostationary earth orbit satellite system and a non-geostationary earth orbit satellite system. Non-geostationary earth orbit satellite systems may be further classified into a medium-earth orbit satellite system and a low-earth orbit satellite system. The low-earth orbit satellite system has advantages of a low orbit altitude and a low propagation delay, and therefore, the low-earth orbit satellite system has become a research focus.

The orbit altitude of the low-earth orbit satellite system is about 500 km to 1000 km. A single satellite covers a small ground area, and the satellite moves at a high speed relative to the ground. Therefore, a cell covered by the satellite also changes constantly, and consequently, a terminal device needs to be frequently handed over. To avoid the terminal device from being frequently handed over, a staring mode is provided. The staring mode means that, as the satellite moves continuously in orbit, a beam of the satellite can always point to a visible ground target in an antenna coverage area. In the staring mode, duration of communication between the terminal device and the satellite can be prolonged, reliability of satellite communication can be improved, and frequent handover can also be avoided. In the staring mode, because a source satellite moves, the source satellite cannot continue to provide a service for a staring area in the staring mode, and a target satellite needs to continue to provide a service for a terminal device in the staring area of the source satellite. In this case, all terminal devices in the staring area of the source satellite need to be handed over to the target satellite. This causes a signaling storm and results in network congestion. Consequently, communication performance is affected.

SUMMARY

This application provides a handover method and apparatus, to avoid a signaling storm and improve communication performance.

According to a first aspect, a handover method is provided, including: determining a part of terminal devices to be handed over in a plurality of terminal devices in a staring area of a first beam; sending a first handover request message to a target satellite, where the first handover request message includes contexts of the part of terminal devices; and receiving a handover instruction sent by the target satellite based on the first handover request message, and sending the handover instruction to the part of terminal devices by using the first beam, where the handover instruction includes handover parameters used for handing over the part of terminal devices.

Therefore, in this embodiment of this application, the part of terminal devices in the plurality of terminal devices in the staring area may be handed over, so that a signaling storm can be avoided and communication performance can be improved.

In some possible implementations, the determining a part of terminal devices to be handed over in a plurality of terminal devices in a staring area of a first beam includes: determining, based on priority information, the part of terminal devices to be handed over in the plurality of terminal devices in the staring area, where the priority information is used to indicate handover priorities of the plurality of terminal devices in the staring area.

In this way, a part of terminal devices to be handed over may be selected from the plurality of terminal devices based on the priority information, so that a handover requirement of a terminal device with a high priority can be preferentially met.

In some possible implementations, the priority information is specifically used to indicate priorities of a plurality of sub-areas forming the staring area. The determining, based on priority information, the part of terminal devices to be handed over from the plurality of terminal devices in the staring area includes: determining, based on the priorities that are of the plurality of sub-areas and that are indicated by the priority information, that terminal devices in a sub-area with a high priority in the plurality of sub-areas are the part of terminal devices.

The plurality of sub-areas in the staring area are obtained through division based on geographical locations.

The plurality of sub-areas in the staring area have priorities, and a terminal device in a sub-area with a high priority also has a high priority. In this way, the terminal device in the sub-area with a high priority is preferentially handed over based on a geographical location. This avoids a signaling storm.

In some possible implementations, the method further includes: receiving measurement reports sent by the plurality of terminal devices in the staring area. The determining, based on priority information, the part of terminal devices to be handed over in the plurality of terminal devices in the staring area includes: determining, based on the measurement reports sent by the plurality of terminal devices in the staring area and the priority information, the part of terminal devices to be handed over in the staring area.

In some possible implementations, the determining, based on the measurement reports sent by the plurality of terminal devices in the staring area and the priority information, the part of terminal devices to be handed over in the staring area includes: determining, based on the measurement reports sent by the plurality of terminal devices in the staring area, terminal devices that meet a handover condition; and preferentially handing over, based on the priority information, a terminal device with a high priority in the terminal devices that meet the handover condition.

In some possible implementations, before the determining, based on priority information, the part of terminal devices to be handed over in the plurality of terminal devices in the staring area, the method further includes: determining the priority information.

In some possible implementations, the determining the priority information includes: receiving the priority information sent by the target satellite, a core network element, or a management network element of a core network element.

In some possible implementations, before the determining a part of terminal devices to be handed over in a staring area of a first beam, the method further includes: classifying the plurality of terminal devices in the staring area to obtain a plurality of batches of terminal devices, where a batch of terminal devices in the plurality of batches of terminal devices are the part of terminal devices.

In some possible implementations, the sending a first handover request message to a target satellite includes: sending the first handover request message to the target satellite after a third handover request message sent by the core network element or the management network element of the core network element is received, where the third handover request message is used to request the source satellite to hand over the part of terminal devices to the target satellite.

Optionally, the third handover request message includes identifiers of the part of terminal devices.

In some possible implementations, the determining a part of terminal devices to be handed over in a plurality of terminal devices in a staring area of a first beam includes: after the third handover request message sent by the core network element or the management network element of the core network element is received, determining the part of terminal devices to be handed over in the plurality of terminal devices in the staring area of the first beam.

According to a second aspect, a handover method is provided, including: receiving a first handover request message, where the first handover request message includes contexts of a part of terminal devices in a staring area of a first beam; generating a handover instruction based on the first handover request message, where the handover instruction includes handover parameters used for handing over the part of terminal devices; and sending the handover instruction to the part of terminal devices by using the first beam of the source satellite.

Therefore, in this embodiment of this application, the part of terminal devices in a plurality of terminal devices in the staring area may be handed over, so that a signaling storm can be avoided and communication performance can be improved.

In some possible implementations, the method further includes: determining a second beam used for handover; and after the sending the handover instruction to the part of terminal devices by using the first beam of the source satellite, the method further includes: handing over the part of terminal devices by using the second beam.

In this way, the second beam for handover may be determined in advance. This facilitates handover, and the second beam can cover the part of terminal devices.

In some possible implementations, after the handing over the part of terminal devices by using the second beam, the method further includes: transmitting data to the part of terminal devices by using the second beam.

Therefore, after handover is performed by using the second beam, the second beam may continue to be used to transmit the data to the part of terminal devices. In this way, beam utilization can be improved.

In some possible implementations, the method further includes: determining priority information, where the priority information is used to indicate handover priorities of the plurality of terminal devices in the staring area.

The determining a second beam used for handover includes: determining, based on the priority information, the part of terminal devices to be handed over in the plurality of terminal devices in the staring area; and determining, based on geographical locations of the part of terminal devices, the second beam used for handover. The second beam can cover the part of terminal devices. If the part of terminal devices are distributed in the entire staring area, the second beam covers the entire staring area; or if the part of terminal devices are distributed in a sub-area of the staring area, the second beam covers the sub-area.

In some possible implementations, the determining priority information includes: receiving the priority information sent by the source satellite or a core network element.

In some possible implementations, the priority information is specifically used to indicate priorities of a plurality of sub-areas forming the staring area. The determining, based on priority information, the part of terminal devices to be handed over from the plurality of terminal devices in the staring area includes: determining, based on the priorities that are of the plurality of sub-areas and that are indicated by the priority information, that terminal devices in a sub-area with a high priority in the plurality of sub-areas are the part of terminal devices.

In some possible implementations, the method further includes: receiving a second handover request message sent by the core network element or a management network element of the core network element; preparing to admit handover of the part of the terminal devices based on the second handover request message; and reserving resources for the terminal devices, where the second handover request message is used to request a target satellite to admit handover of the part of terminal devices. Optionally, the second handover request message includes identifiers of the part of terminal devices.

According to a third aspect, a handover method is provided, including: determining a part of terminal devices to be handed over in a plurality of terminal devices in a staring area of a first beam; and sending a second handover request message and a third handover request message to a target satellite and the source satellite respectively, where the second handover request message is used to request the target satellite to admit handover of the part of terminal devices, and the third handover request message is used to request the source satellite to hand over the part of terminal devices to the target satellite.

Optionally, the second handover request message includes identifiers of the part of terminal devices, and the third handover request message includes the identifiers of the part of terminal devices.

In some possible implementations, the determining a part of terminal devices to be handed over in a plurality of terminal devices in a staring area of a first beam includes: determining priority information, where the priority information is used to indicate handover priorities of the plurality of terminal devices in the staring area of the first beam of the source satellite; and determining, based on the priority information, the part of terminal devices to be handed over in the plurality of terminal devices in the staring area of the first beam of the source satellite.

In some possible implementations, the method further includes: sending the priority information to the source satellite and the target satellite.

In some possible implementations, the priority information is specifically used to indicate priorities of a plurality of sub-areas forming the staring area. The determining, based on the priority information, the part of terminal devices to be handed over from the plurality of terminal devices in the staring area of the first beam of the source satellite includes: determining, based on the priorities that are of the plurality of sub-areas and that are indicated by the priority information, that terminal devices in a sub-area with a high priority in the plurality of sub-areas are the part of terminal devices.

According to a fourth aspect, this application provides a handover apparatus, configured to implement the method in the first aspect and/or any possible implementation of the first aspect. The apparatus may be a network device, or may be an apparatus in a network device, or may be an apparatus that can be used together with a network device. In a design, the apparatus may include a corresponding module for performing the method/operation/step/action described in the first aspect and/or any possible implementation of the first aspect. The module may be a hardware circuit, may be software, or may be implemented by a hardware circuit in combination with software. In a design, the apparatus may include a processing unit and a transceiver unit.

According to a fifth aspect, this application provides a handover apparatus, configured to implement the method in the second aspect and/or any possible implementation of the second aspect. The apparatus may be a network device, or may be an apparatus in a network device, or may be an apparatus that can be used together with a network device. In a design, the apparatus may include a corresponding module for performing the method/operation/step/action described in the second aspect and/or any possible implementation of the second aspect. The module may be a hardware circuit, may be software, or may be implemented by a hardware circuit in combination with software. In a design, the apparatus may include a processing unit and a transceiver unit.

According to a sixth aspect, this application provides a handover apparatus, configured to implement the method in the third aspect and/or any possible implementation of the third aspect. The apparatus may be a network device, or may be an apparatus in a network device, or may be an apparatus that can be used together with a network device. In a design, the apparatus may include a corresponding module for performing the method/operation/step/action described in the third aspect and/or any possible implementation of the third aspect. The module may be a hardware circuit, may be software, or may be implemented by a hardware circuit in combination with software. In a design, the apparatus may include a processing unit and a transceiver unit.

According to a seventh aspect, this application provides a handover apparatus. The apparatus includes a processor, configured to implement the method described in the first aspect and/or any possible implementation of the first aspect. The apparatus may further include a memory. Optionally, the memory is configured to store instructions. When executing the instructions stored in the memory, the processor may implement the method described in the first aspect and/or any possible implementation of the first aspect. The apparatus may further include a communications interface. The communications interface is used by the apparatus to communicate with another device. For example, the communications interface may be a transceiver, a circuit, a bus, a module, a pin, or another type of communications interface.

According to an eighth aspect, this application provides a handover apparatus. The apparatus includes a processor, configured to implement the method described in the second aspect and/or any possible implementation of the second aspect. The apparatus may further include a memory. Optionally, the memory is configured to store instructions. When executing the instructions stored in the memory, the processor may implement the method described in the second aspect and/or any possible implementation of the second aspect. The apparatus may further include a communications interface, and the communications interface is used by the apparatus to communicate with another device.

According to a ninth aspect, this application provides a handover apparatus. The apparatus includes a processor, configured to implement the method described in the third aspect and/or any possible implementation of the third aspect. The apparatus may further include a memory. Optionally, the memory is configured to store instructions. When executing the instructions stored in the memory, the processor may implement the method described in the third aspect and/or any possible implementation of the third aspect. The apparatus may further include a communications interface, and the communications interface is used by the apparatus to communicate with another device.

According to a tenth aspect, this application provides a data transmission system, where the system includes the apparatus provided in the fourth aspect and the apparatus provided in the fifth aspect; or the system includes the apparatus provided in the fourth aspect, the apparatus provided in the fifth aspect, and the apparatus provided in the sixth aspect; or the system includes the apparatus provided in the seventh aspect and the apparatus provided in the eighth aspect.

The system includes the apparatus provided in the seventh aspect, the apparatus provided in the eighth aspect, and the apparatus provided in the ninth aspect.

According to an eleventh aspect, this application provides a computer-readable storage medium. The computer-readable storage medium stores computer instructions. When the computer instructions are run on a computer, the computer is enabled to perform the method in the foregoing aspects and any possible design of the foregoing aspects.

According to a twelfth aspect, this application provides a chip, including a processor. The processor is configured to perform the method in the foregoing aspects and any possible implementation of the foregoing aspects.

Optionally, the chip further includes a memory, and the memory is coupled to the processor.

Further, optionally, the chip further includes a communications interface.

According to a thirteenth aspect, this application provides a computer program product. The computer program product includes computer program code. When the computer program code is run on a computer, the computer is enabled to perform the method in the foregoing aspects and any possible design of the foregoing aspects.

DESCRIPTION OF EMBODIMENTS

Figure 1:
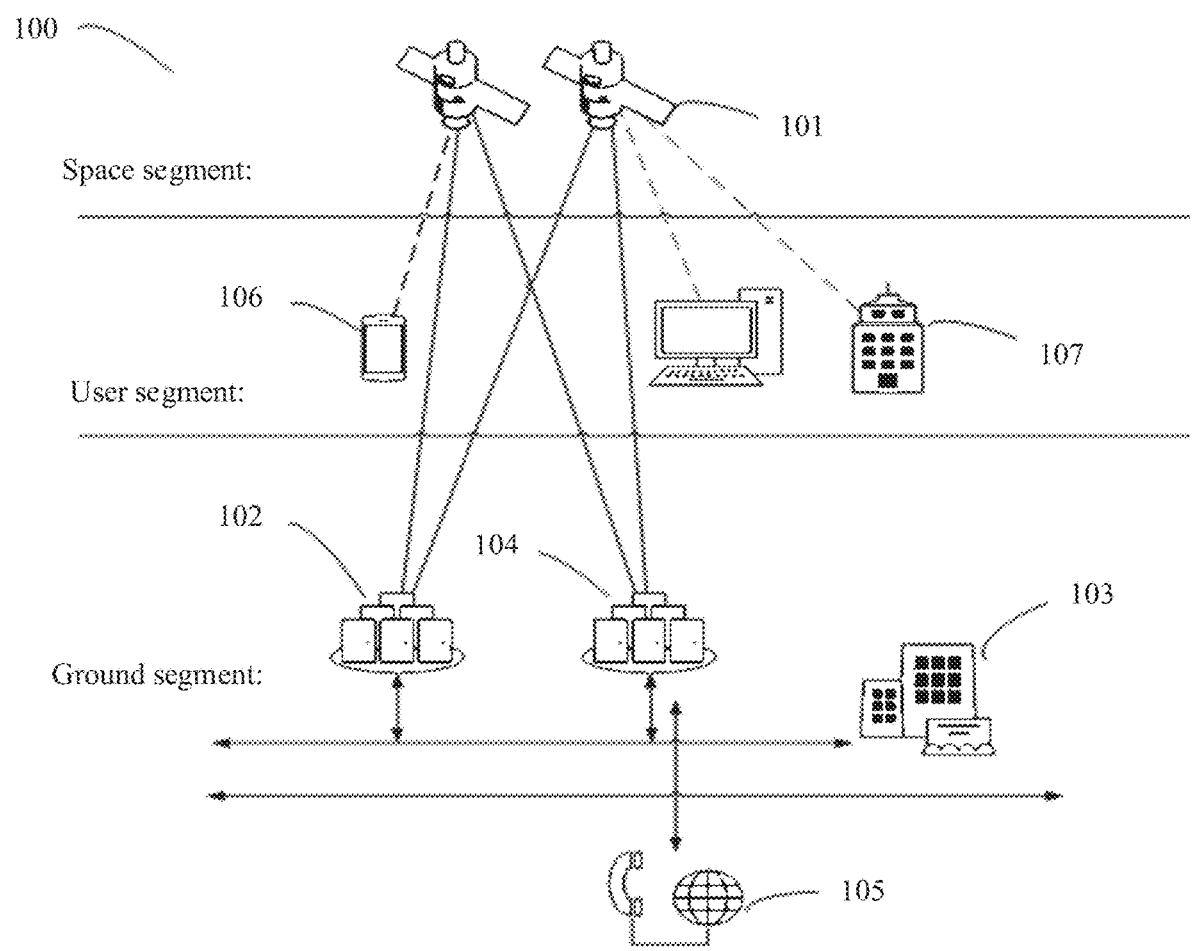
FIG. 1 is a schematic diagram of an architecture of a satellite communications system according to an embodiment of this application.

The technical solutions of this application may be applied to a satellite communications system. FIG. 1 is a schematic diagram of an architecture of a satellite communications system. A satellite communications system 100 usually includes three parts: a space segment, a ground segment, and a user segment. The space segment may include a geostationary earth orbit (GEO) satellite, a non-geostationary earth orbit (NGEO) satellite, or a multi-satellite network 101 including both the GEO and the NGEO. The ground segment usually includes a satellite measurement and control center 102, a network control center (NCC) 103, various gateways 104, and the like, and the gateway is also referred to as a gateway station. The network control center is also referred to as a system control center (SCC). The user segment includes various terminal devices. The terminal devices may be various mobile terminals 106, for example, mobile satellite phones, or may be various fixed terminals 107, for example, communications ground stations. A dashed line in FIG. 1 indicates a communication signal between a satellite and a terminal; a solid line indicates a communication signal between a satellite and a device in the ground segment; and a double-arrowhead line indicates a communication signal between network elements in the ground segment. In the satellite communications system, the satellite may also be referred to as a satellite base station. In FIG. 1, the satellite base station may transmit downlink data to the terminal device, where the downlink data may be transmitted to the terminal device after channel coding, and modulation mapping. The terminal device may also transmit uplink data to the satellite base station, where the uplink data may also be transmitted to the satellite base station after channel coding, and modulation mapping.

The satellite measurement and control center 102 in the ground segment has functions of maintaining, monitoring, and controlling an orbit location and attitude of the satellite, and managing an ephemeris of the satellite, and the like. The network control center 103 has functions of user registration processing, identity confirmation, and billing, and other network management functions. In some satellite mobile communications systems, the network control center and the satellite measurement and control center are integrated. The gateway station 104 has functions such as call processing, switching, and interfacing with a ground communications network. A ground communications network 105 is a component of the ground segment of the satellite network, and is configured to switch a data packet of the satellite to a core network to send the data packet to a final terminal device. The ground communications network may be a public switched telephone network (PSTN), a public land mobile network (PLMN), or another dedicated network. Different ground communications networks require that gateway stations have different gateway functions.

In some satellite communications systems, a space segment of the satellite communications system may be of a multi-layer structure including a management satellite and one or more serving satellites. In a network of the satellite communications systems with the multi-layer structure, the space segment may include one or more management satellites and a serving satellite managed by the management satellite. The satellite or the satellite base station mentioned in this application is not limited to the management satellite or the serving satellite.

Non-geostationary earth orbit satellite systems may be further classified into a medium-earth orbit (MEO) satellite system and a low-earth orbit (LEO) satellite system. Due to a low orbit altitude and a low propagation delay, the low-earth orbit satellite system has become a development focus in the global communication field. The orbit altitude of the low-earth orbit satellite system is about 500 km to 1000 km. A single low-earth orbit satellite covers a small ground area and moves at a high speed (25000 km/h) relative to the ground. An average over-the-top time of a single low-earth orbit satellite is about a few minutes. Therefore, cell coverage of the low-earth orbit satellite also changes with time. This causes frequent handover and tracking area update, and the like. To avoid frequent handover and tracking area update, a staring mode is provided. The staring mode means that, as the satellite moves continuously in orbit, an antenna beam of the satellite can always point to a visible ground target in an antenna coverage area. In the staring mode, a beam direction of the satellite is adjusted in a timely manner, so that communication duration can be prolonged when the satellite is visible, and energy waste can be reduced by concentrating power. This improves reliability and security of satellite communication. In addition, in the staring mode, frequent handover can be avoided, and a movement management operation is facilitated. In a satellite system supporting the staring mode, because a satellite moves, a satellite beam that serves an area needs to change when a specific condition is met. In this case, all terminal devices in the area need to be handed over to a new satellite beam to continue communication. When all terminal devices in a coverage area of the satellite beam simultaneously initiate handover, a signaling storm occurs. This results in network congestion, and even affects normal communication.

Figure 2:
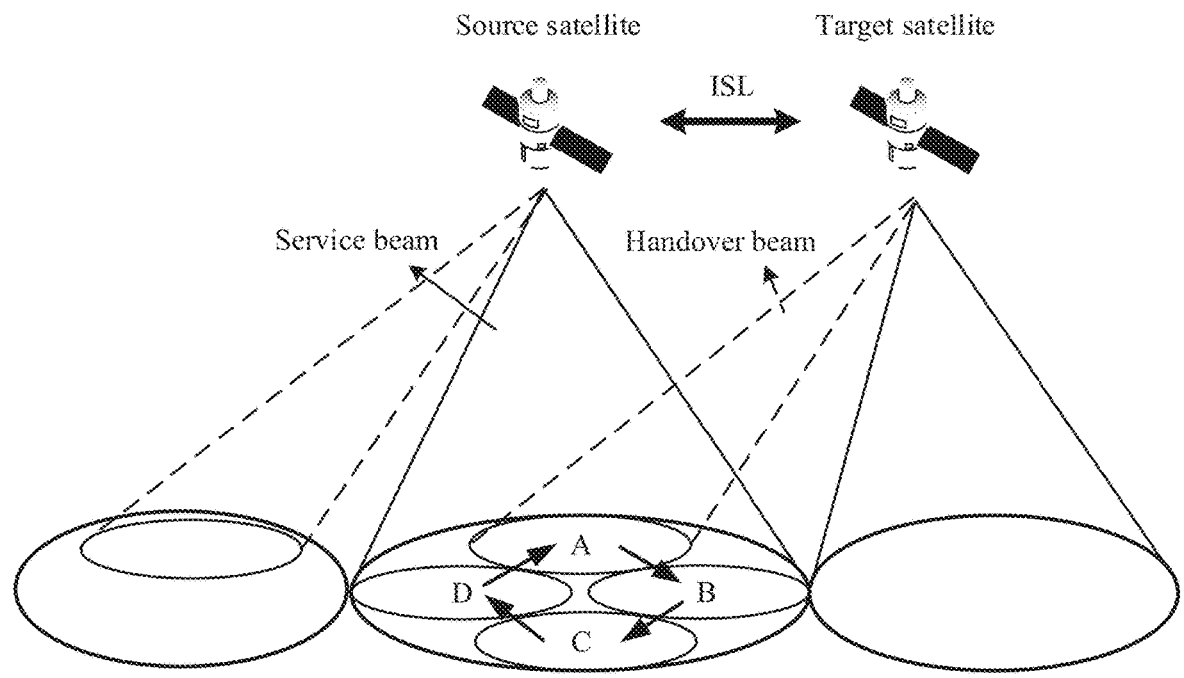
FIG. 2 is a schematic diagram of an application scenario according to an embodiment of this application.

To avoid a signaling storm caused by handing over terminal devices in a staring area in a staring mode, an embodiment of this application provides a handover method. The terminal devices in the staring area may be handed over in batches, to avoid a signaling storm. For example, FIG. 2 is a schematic diagram of an application scenario according to an embodiment of this application. As a source satellite moves, the source satellite may leave the horizon. In this case, a terminal device in a staring area of a service beam of the source satellite needs to be handed over to a target satellite. The service beam may be understood as a beam that provides service data for the terminal device in the staring area. If all terminal devices in the staring area are handed over simultaneously, a signaling storm occurs. In this embodiment of this application, the terminal devices in the staring area may be handed over in batches. For example, as shown in FIG. 2, the target satellite may sequentially hand over terminal devices in an area A, an area B, an area C, and an area D in the staring area by using a handover beam. In this way, a signaling storm can be avoided, network congestion can be reduced, and transmission performance can be improved. The source satellite and the target satellite may communicate through an inter-satellite link (ISL).

Figure 3:
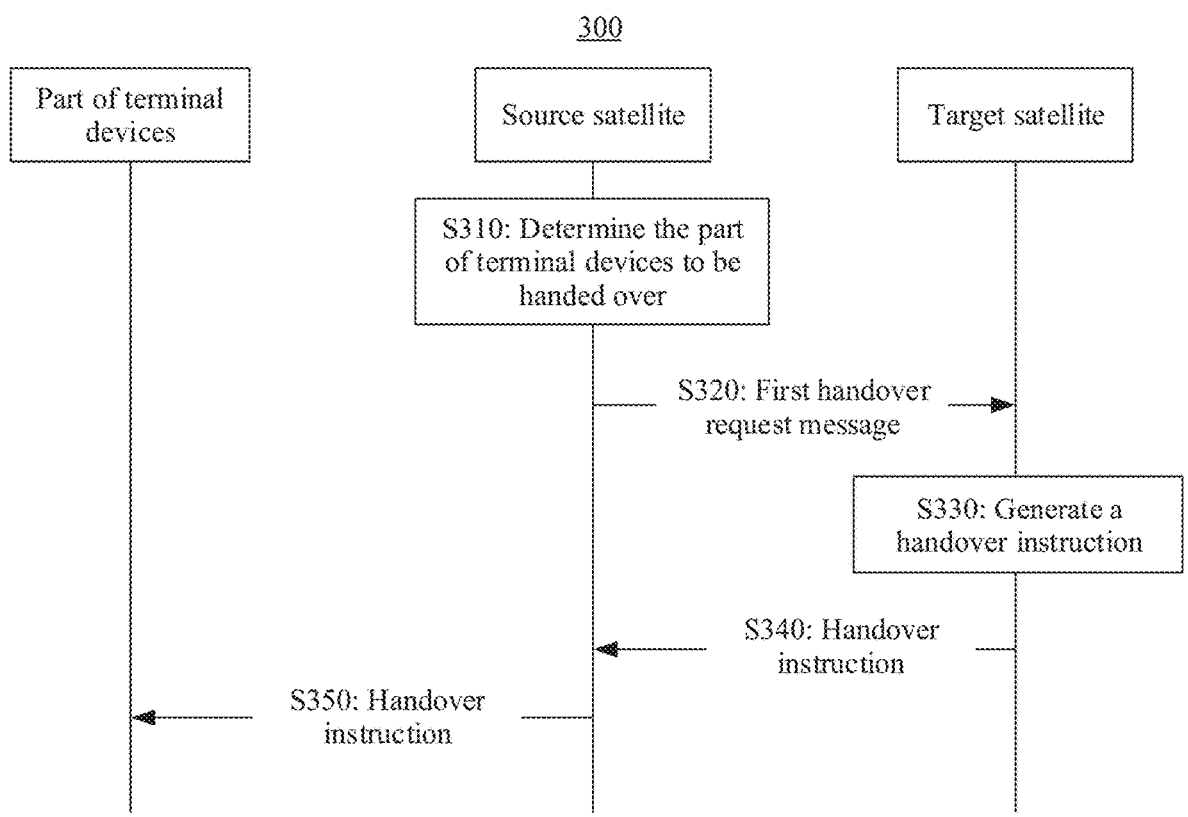
FIG. 3 is a schematic diagram of a handover method according to an embodiment of this application.

With reference to FIG. 3, the following describes a handover method 300 provided in an embodiment of this application. The method 300 includes the following steps:

S310: A source satellite determines a part of terminal devices to be handed over in a plurality of terminal devices in a staring area of a first beam.

S310 may have the following cases.

Case 1: The source satellite may randomly select the part of terminal devices in the staring area.

Case 2: The source satellite may receive a third handover request message sent by a core network element/a management network element of a core network element, where the third handover request message includes identifiers of the part of terminal devices to be handed over. In this way, the source satellite may determine, based on the third handover request message, the part of terminal devices to be handed over.

Case 3: The source satellite may select the part of terminal devices in the staring area according to some specific rules. For example, the source satellite determines the part of terminal devices based on priority information in the staring area, where the priority information is used to indicate handover priorities of the plurality of terminal devices in the staring area.

Specifically, the priority information may be determined based on a service type of the terminal device, a delay requirement of the terminal device, a type of the terminal device, and a location of the terminal device (for example, a location of the terminal device in the staring area). For example, a handover priority of a terminal device with an ultra-reliable low-latency (URLLC) service type is higher than a handover priority of a terminal device with an enhanced mobile broadband (EMBB) service type and a handover priority of a terminal device with a massive machine-type communications (MMTC) service type.

In the foregoing case 3, the source satellite may determine the part of terminal devices based on the priority information in the staring area in at least one of the following manners.

Manner 1: The priority information is specifically used to indicate priorities of a plurality of sub-areas forming the staring area. That the part of terminal devices to be handed over in the staring area are determined based on the priority information includes: determining, based on priorities that are of the plurality of sub-areas and that are indicated by the priority information, that terminal devices in a sub-area with a high priority in the plurality of sub-areas are the part of terminal devices. For example, as shown in FIG. 2, the staring area is divided into four sub-areas A, B, C, and D, and the priority information is used to indicate that priorities of the four sub-areas are: a priority of A, a priority of B, a priority of C, and a priority of D in descending order. The source satellite may determine, based on the priorities of the four sub-areas, that priorities of terminal devices in the staring area are: a priority of terminal devices in the sub-area A, a priority of terminal devices in the sub-area B, a priority of terminal devices in the sub-area C, and a priority of terminal devices in the sub-area D in descending order. When the terminal devices in the staring area start to be handed over, the terminal devices in the sub-area A may be determined as the part of terminal devices to be handed over, and after the terminal devices in the sub-area A are handed over, the terminal devices in the sub-area B, the terminal devices in the sub-area C, and the terminal devices in the sub-area D are sequentially handed over. In this way, the terminal devices in the staring area can be handed over in batches. This can avoid a signaling storm.

Manner 2: The source satellite receives measurement reports sent by the plurality of terminal devices in the staring area: and the source satellite determines, based on the measurement reports sent by the plurality of terminal devices in the staring area and the priority information, the part of terminal devices to be handed over in the staring area. To be specific, the plurality of terminal devices in the staring area may send the measurement reports to the source satellite; and the source satellite determines, based on the measurement reports of the plurality of terminal devices, terminal devices that meets a handover condition, and determines, based on the priority information from the terminal devices that meet the handover condition, the part of terminal devices to be handed over. For example, 100 terminal devices in the staring area send measurement reports to the source satellite, and the source satellite determines, based on the measurement reports, that 80 terminal devices in the 100 terminal devices meet the handover condition. However, if the 80 terminal devices are simultaneously handed over, a signaling storm may occur. To avoid the signaling storm, 40 terminal devices with a relatively high priority may be first handed over based on priorities of the 80 terminal devices, and then 40 terminal devices with a relatively low priority are handed over.

S320: The source satellite sends a first handover request message to a target satellite, and the target satellite receives the first handover request message sent by the source satellite, where the first handover request message includes contexts of the part of terminal devices.

For example, the contexts of the part of terminal devices may include radio resource control (RRC) contexts and/or radio bearer contexts. To be specific, the source satellite may send, to the target satellite by using the handover request message, the contexts of the part of terminal devices that need to be handed over, or may send, to the target satellite by using the handover request message, RRC signaling contexts of the part of terminal devices that need to be handed over, or may send, to the target satellite, the radio bearer contexts of the part of terminal devices that need to be handed over.

S330: The target satellite generates a handover instruction based on the handover request message, where the handover instruction includes handover parameters, and the handover parameters are used for handing over the part of terminal devices. For example, the handover parameters include a cell radio network temporary identifier (C-RNTI) allocated by the target satellite to the part of terminal devices, and a security algorithm identifier, system information, and an access parameter of the target satellite.

Specifically, after receiving the handover request message, the target satellite performs admission control, and completes handover preparation works such as resource reservation and C-RNTI allocation to the part of terminal devices.

S340: The target satellite sends the handover instruction to the source satellite, and the source satellite receives the handover instruction sent by the target satellite.

S350: The source satellite sends the handover instruction to the part of terminal devices by using the first beam. The source satellite may send, to the part of terminal devices by using the first beam, the handover instruction to be sent by the target satellite to the part of terminal devices. In this way, the part of terminal devices may be handed over to the target satellite based on the handover parameters included in the handover instruction.

In some possible implementations, the method 300 further includes: The source satellite determines priority information of the plurality of terminal devices in the staring area. The target satellite also needs to determine the priority information. The source satellite and the target satellite may determine the priority information in the following three manners.

Manner 1: The source satellite determines the priority information, and the source satellite may send the determined priority information to the target satellite. For example, the source satellite may send the determined priority information to the target satellite through an ISL.

Manner 2. The target satellite determines the priority information, and sends the determined priority information to the source satellite. For example, the target satellite may send the determined priority information to the source satellite through an ISL.

Manner 3: A core network element or a management network element of a core network element determines the priority information, and sends the determined priority information to the source satellite and the target satellite.

The source satellite determines the priority information, to determine, based on the priority information, terminal devices to be handed over, and sends, to the target satellite by using the handover request message, contexts of the terminal devices that need to be handed over. The target satellite learns the priority information, to determine terminal devices to be handed over, and determine, in advance, for the terminal devices that need to be handed over, a second beam used for handover. In this way, when handover needs to be performed, the second beam may be used for handover.

Specifically, if the priority information is used to indicate the handover priorities of the plurality of the terminal devices in the staring area, the target satellite determines the second beam based on the determined part of terminal devices to be handed over in the plurality of terminal devices in the staring area and geographical locations of the part of terminal devices. To be specific, the target satellite needs to determine the geographical locations of the part of terminal devices, and ensure that the second beam can cover the part of terminal devices. In this way, the target satellite can better perform handover by using the second beam. For example, if the part of terminal devices are in a first sub-area of the staring area, the second beam needs to cover the first sub-area. For another example, the part of terminal devices are in the entire staring area, the second beam needs to cover the entire staring area.

In some possible implementations, after the target satellite hands over the part of terminal devices by using the second beam, the target satellite may transmit data to the part of terminal devices by using the second beam. In other words, the handover beam may become a service beam and continue to provide service data for the part of terminal devices. This can improve beam utilization.

Therefore, according to the handover method provided in this embodiment of this application, the terminal devices in the staring area are handed over in batches. For example, the terminal devices in the staring area may be determined based on the priority information, so as to avoid a signaling storm. The target satellite may determine the second beam for the part of terminal devices that need to be handed over, and the second beam may cover, in advance, the part of terminal devices that need to be handed over. After the part of terminal devices are handed over by using the second beam, the second beam may become the service beam to continue to provide the service data for the part of terminal devices.

With reference to FIG. 4 to FIG. 8, the following describes a handover method provided in embodiments of this application in detail.

Figure 4:
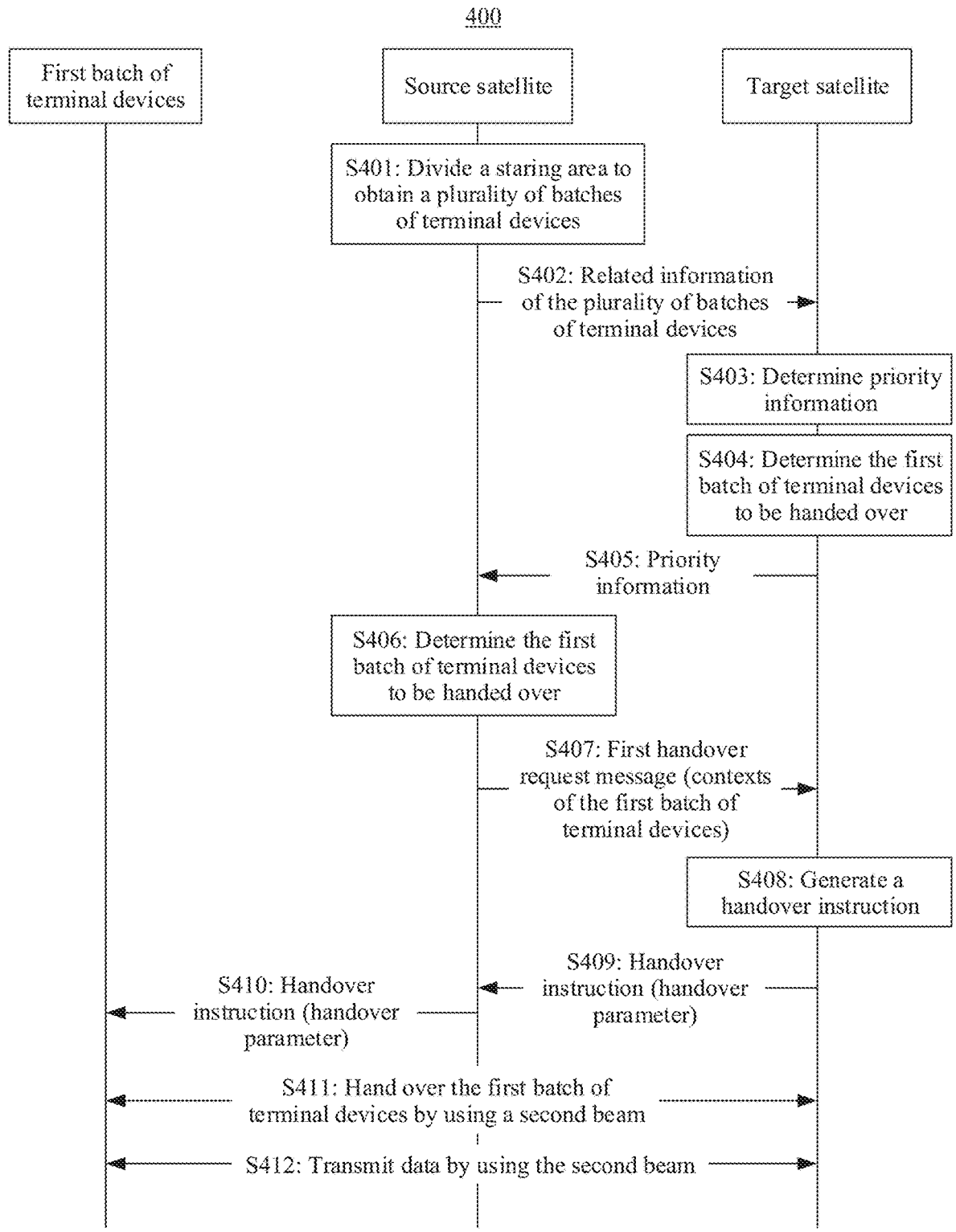
FIG. 4 is a schematic diagram of another handover method according to an embodiment of this application.

FIG. 4 shows a handover method 400 according to an embodiment of this application. The method 400 includes the following steps.

S401: A source satellite classifies, in a staring area of a first beam according to a specific rule, terminal devices in the staring area into a plurality of batches of terminal devices, where a handover operation is to be performed on terminal devices in a same batch simultaneously. For example, the plurality of batches of terminal devices may be obtained through classification based on service types, geographical locations, latency requirements, or the like of a plurality of terminal devices in the staring area.

S402: The source satellite sends related information of the plurality of batches of terminal devices obtained through classification to a target satellite. For example, the related information may indicate how the plurality of batches of terminal devices are obtained through classification.

S403: The target satellite determines a handover sequence of the plurality of batches of terminal devices, that is, the foregoing priority information.

S404: The target satellite determines, based on the priority information, a first batch of terminal devices that need to be handed over, and determines, for the first batch of terminal devices, a second beam used for handover, where the second beam can cover the first batch of terminal devices.

Specifically, S404 includes: determining, based on the priority information, the first batch of terminal devices to be handed over in the plurality of terminal devices in the staring area; and determining, based on geographical locations of the first batch of terminal devices, the second beam used for handover. In other words, the target satellite may determine, based on the priority information, the first batch of terminal devices to be handed over, determine, in advance for the first batch of terminal devices, the second beam used for handover, prepare the second beam in advance, and ensure that the second beam can cover the first batch of terminal devices.

It should be noted that S404 needs to be performed after S403, and there is no sequence limitation between S404 and other steps. In other words, the target satellite needs to cover the first batch of terminal devices by using the second beam before handover.

S405: The target satellite sends the priority information to the source satellite through an ISL.

S406: The source satellite determines, based on the priority information, the first batch of terminal devices that need to be handed over (for example, the first batch of terminal devices may be the foregoing part of terminal devices).

S407: The source satellite sends a first handover request message to the target satellite, and the target satellite receives the first handover request message sent by the source satellite, where the first handover request message includes contexts of the first batch of terminal devices. For example, the contexts of the first batch of terminal devices may be radio bearer contexts or RRC contexts.

S408: The target satellite generates a handover instruction based on the first handover request message, where the handover instruction includes handover parameters used for handing over the first batch of terminal devices.

S409: The target satellite sends the handover instruction to the source satellite, and the source satellite receives the handover instruction sent by the target satellite.

S410: The source satellite sends the handover instruction to the first batch of terminal devices by using the first beam, and the first batch of terminal devices receive the handover instruction sent by the source satellite by using the first beam.

S411: The target satellite performs handover on the first batch of terminal devices by using the second beam, and the first batch of terminal devices are handed over by using the handover parameters included in the handover instruction. For example, the handover may specifically include operations such as synchronization with the target satellite and RRC reestablishment. For example, the first batch of terminal devices perform synchronization and RRC reestablishment on a physical resource of the second beam.

S412: After performing handover on the first batch of terminal devices by using the second beam, the target satellite continues to use the second beam to transmit service data to the first batch of terminal devices.

After the first batch of terminal devices are handed over, S404 and S406 to S412 are performed again. A second batch of terminal devices in the plurality of batches of terminal devices continue to be handed over. For example, in S404, the target satellite determines, for the second batch of terminal devices, a third beam used for handover, where the third beam can cover the second batch of terminal devices. In S412, after performing handover on the second batch of terminal devices by using the third beam, the target satellite continues to use the third beam to transmit service data to the second batch of terminal devices. In this way, the plurality of terminal devices in the staring area can be handed over in batches. This can avoid a signaling storm. Further, after the handover is completed, the beam used for handover may continue to provide the service data for the terminal devices. This improves beam utilization.

Figure 5:
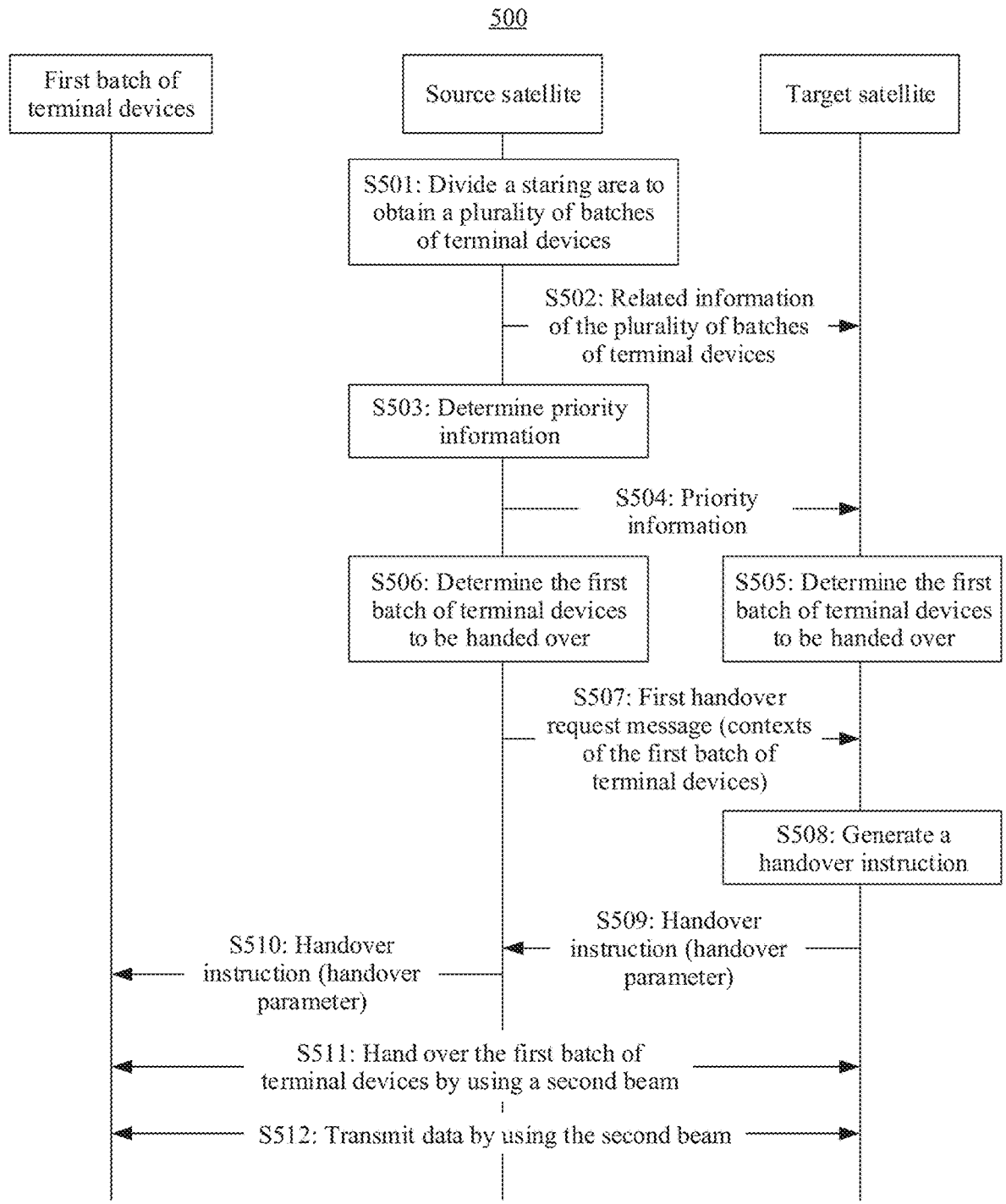
FIG. 5 is a schematic diagram of still another handover method according to an embodiment of this application.

FIG. 5 shows a handover method 500 according to an embodiment of this application. A difference between the method 400 and the method 500 lies in that, in the method 400, the target satellite determines the priority information and sends the priority information to the source satellite, but in the method 500, a source satellite determines priority information and sends the priority information to a target satellite; and other steps are the same. Specifically, the method 500 includes the following steps.

S501 is the same as S401.

S502 is the same as S402.

S503: The source satellite determines a handover sequence of the plurality of batches of terminal devices, that is, the foregoing priority information.

S504: The source satellite sends the priority information to the target satellite.

S505 is the same as S504.

It should be noted that S505 needs to be performed after S504, and there is no sequence limitation between S505 and other steps. In other words, the target satellite needs to cover the first batch of terminal devices by using the second beam before handover.

S506 to S512 are the same as S406 to S412.

After the first batch of terminal devices are handed over, S504 and S506 to S512 are performed again. A second batch of terminal devices in the plurality of batches of terminal devices continue to be handed over. For example, in S504, the target satellite determines, for the second batch of terminal devices, a third beam used for handover, where the third beam can cover the second batch of terminal devices.

In S512, after performing handover on the second batch of terminal devices by using the third beam, the target satellite continues to use the third beam to transmit service data to the second batch of terminal devices. In this way, the plurality of terminal devices in the staring area can be handed over in batches. This can avoid a signaling storm. Further, after the handover is completed, the beam used for handover may continue to provide the service data for the terminal devices. This improves beam utilization.

Figure 6:
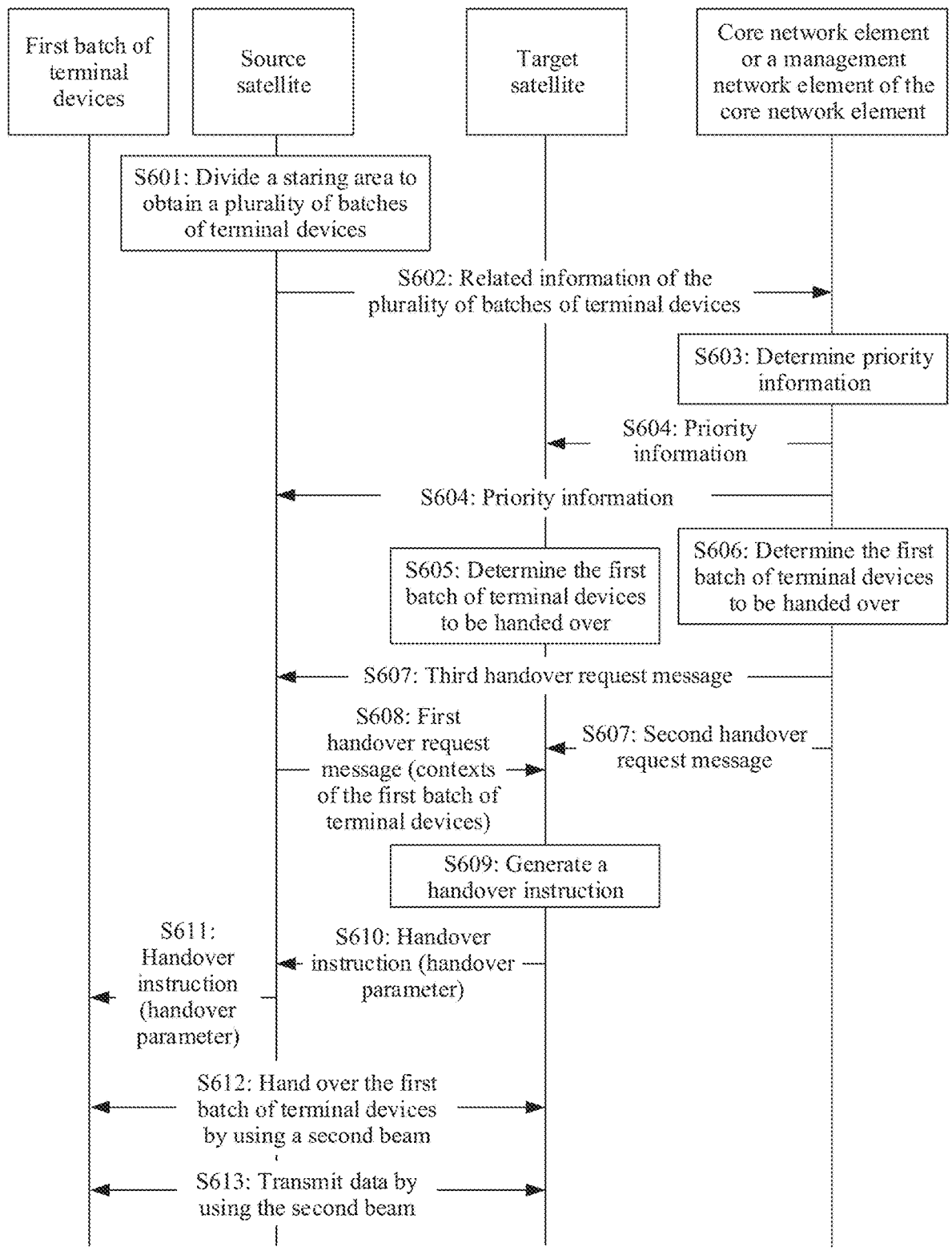
FIG. 6 is a schematic diagram of yet another handover method according to an embodiment of this application.

FIG. 6 shows a handover method according to an embodiment of this application. The method 600 includes the following steps.

S601 is the same as S401.

S602: The source satellite sends related information of the plurality of batches of terminal devices obtained through classification to a core network element or a management network element of a core network element.

S603: The core network element or the management network element of the core network element determines a handover sequence of the plurality of batches of terminal devices, that is, the foregoing priority information.

S604: The core network element or the management network element of the core network element sends the priority information to the source satellite and a target satellite. For example, the core network element or the management network element of the core network element sends the priority information to the source satellite and the target satellite through a satellite-to-ground link.

It should be noted that, in S604, the core network element or the management network element of the core network element may send the priority information to the source satellite and the target satellite simultaneously, or first send the priority information to the source satellite and then send the priority information to the target satellite, or first send the priority information to the target satellite and then send the priority information to the source satellite.

It should be noted that the core network element or the management network element of the core network element sends the priority information to the source satellite through the satellite-to-ground link, so that the source satellite makes a preparation in advance for the terminal devices that need to be handed over. For example, the preparation includes: resource reservation, measurement in advance, and the like.

S605 is the same as S404.

It should be noted that S605 needs to be performed after S604, and there is no sequence limitation between S605 and other steps. In other words, the target satellite needs to cover the first batch of terminal devices by using the second beam before handover.

S606: The core network element or the management network element of the core network element determines, based on the priority information, the first batch of terminal devices that need to be handed over (for example, the first batch of terminal devices may be the foregoing part of terminal devices), and the target satellite sends the priority information to the source satellite through an ISL.

In some possible implementations, the priority information is specifically used to indicate priorities of a plurality of sub-areas forming the staring area, and S606 includes: determining, based on the priorities that are of the plurality of sub-areas and that are indicated by the priority information, that terminal devices in a sub-area with a high priority in the plurality of sub-areas are the first batch of terminal devices.

S607: The core network element or the management network element of the core network element sends a second handover request message and a third handover request message to the target satellite and the source satellite respectively, where the second handover request message is used to request the target satellite to admit handover of the first batch of terminal devices, and the third handover request message is used to request the source satellite to hand over the first batch of terminal devices to the target satellite.

It should be noted that in S607, there is no limitation on a sequence in which the core network element or the management network element of the core network element sends the second handover request message and the third handover request message to the source satellite and the target satellite, and the second handover request message and the third handover request message may be sent simultaneously or sequentially.

S608: After receiving the third handover request message, the source satellite sends a first handover request message to the target satellite, and the target satellite receives the first handover request message sent by the source satellite, where the first handover request message includes contexts of the first batch of terminal devices. For example, the contexts of the first batch of terminal devices may be radio bearer contexts or RRC contexts.

S609 to S613 are the same as S408 to S412.

After the first batch of terminal devices are handed over, S605 and S607 to S613 are performed again. A second batch of terminal devices in the plurality of batches of terminal devices continue to be handed over. For example, in S605, the target satellite determines, for the second batch of terminal devices, a third beam used for handover, where the third beam can cover the second batch of terminal devices. In S613, after performing handover on the second batch of terminal devices by using the third beam, the target satellite continues to use the third beam to transmit service data to the second batch of terminal devices. In this way, the core network element or the management network element of the core network element may control batch handover of the plurality of terminal devices in the staring area. This can avoid a signaling storm. Further, after the handover is completed, the beam used for handover may continue to provide the service data for the terminal devices. This improves beam utilization.

Figure 7:
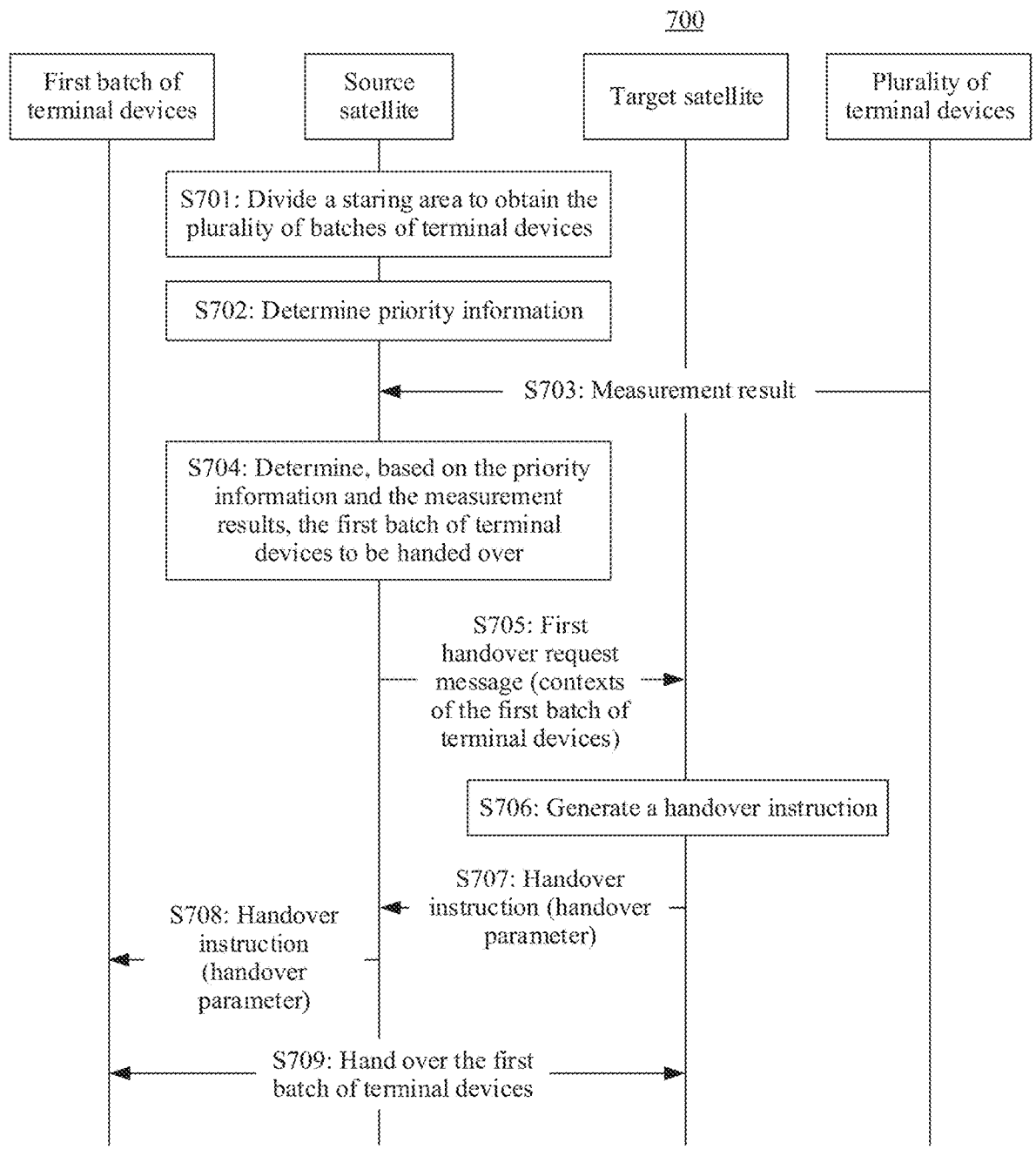
FIG. 7 is a schematic diagram of a further handover method according to an embodiment of this application.

FIG. 7 shows a handover method 700 according to an embodiment of this application. A plurality of terminal devices in FIG. 7 include a first batch of terminal devices, and the method 700 includes the following steps.

S701: A source satellite classifies, in a staring area of a first beam according to a specific rule, terminal devices in the staring area into a plurality of batches of terminal devices, where a handover operation is to be performed on terminal devices in a same batch simultaneously. For example, the plurality of batches of terminal devices may be obtained through classification based on service types, geographical locations, latency requirements, or the like of the plurality of terminal devices in the staring area.

S702: The source satellite determines a handover sequence of the plurality of batches of terminal devices, that is, the foregoing priority information.

In an alternative manner of S702, the source satellite sends related information of the plurality of batches of terminal devices to a target satellite, and the target satellite determines the priority information, and then sends the priority information to the source satellite. In another alternative manner of S702, the source satellite may send related information of the plurality of batches of terminal devices to a core network element or a management network element of a core network element, and the core network element or the management network element of the core network element determines the priority information, and then sends the priority information to the source satellite.

S703: The plurality of terminal devices in the staring area perform measurement, and send measurement reports to the source satellite.

S704: The source satellite determines, based on the measurement reports, terminal devices that meet a handover condition. If there are too many terminal devices that meet the handover condition, a signaling storm may still occur. Therefore, the source satellite needs to determine, based on the priority information from the terminal devices that meet the handover condition, the first batch of terminal devices that need to be handed over (for example, the first batch of terminal devices may be the foregoing part of terminal devices).

For example, the terminal device that meets the handover condition may be a terminal device whose channel quality is less than a preset threshold.

S705 to S708 are the same as S407 to S410.

S709: The target satellite hands over the first batch of terminal devices.

After S704 to S709 are performed, to be specific, after the first batch of terminal devices that meet the handover condition are handed over, S704 to S709 are performed again to hand over a second batch of terminal devices that meet the handover condition. In this way, the source satellite can hand over terminal devices in batches based on the priority information among the terminal devices that meet the handover condition. This can avoid a signaling storm.

It should be noted that, in the method 700, a handover beam (the foregoing second beam) of the target satellite covers the entire staring area. In this way, any terminal device that meets the handover condition and has a relatively high priority in the staring area can be handed over.

It should also be noted that, in the method 700, the plurality of terminal devices in the staring area report the measurement reports, the source satellite determines, based on the measurement reports and the priority information, the first batch of terminal devices to be handed over, and the target satellite completes handover of the first batch of terminal devices. The source satellite may continue to determine, based on the measurement reports and the priority information in S704, the second batch of terminal devices to be handed over, or the like. That is, in the method 700, each of the plurality of terminal devices in the staring area reports a measurement report once. The source satellite may hand over in batches, based on the current measurement reports and the priority information, terminal devices that meet a handover condition. In an alternative manner of S703 and S704, each of the plurality of terminal devices in the staring area may report measurement reports for a plurality of times; and the source satellite may hand over, based on a measurement report reported once and the priority information, a batch of terminal devices that meet the handover condition, and hand over, based on the measurement reports reported for a plurality of times and the priority information, terminal devices that meet the measurement condition in batches. For example, in S703, each of 200 terminal devices in the staring area of the first beam of the source satellite reports a measurement report once, and there are 200 measurement reports in total. The source satellite determines, based on the measurement reports, that 100 terminal devices meet the measurement condition. If priorities of 50 terminal devices in the 100 terminal devices are higher than priorities of the other 50 terminal devices, the source satellite determines that the 50 terminal devices with higher priorities are the first batch of terminal devices, and the second batch of other 50 terminal devices with lower priorities are handed over after the first batch of terminal devices are handed over. In other words, the measurement report reported once may determine a plurality of batches of terminal devices to be handed over. In another example, each of 200 terminal devices in the staring area of the first beam of the source satellite reports a measurement report once. There are 200 measurement reports in total. The source satellite determines, based on the measurement report, that 100 terminal devices meet the measurement condition. If priorities of 50 terminal devices in the 100 terminal devices are higher than priorities of the other 50 terminal devices, the source satellite determines that the 50 terminal devices with higher priorities are the first batch of terminal devices, and the target satellite performs handover on the first batch of terminal devices. Each of the 200 terminal devices in the staring area of the first beam of the source satellite reports a measurement report again. There are 200 measurement reports in total. The source satellite determines, based on the measurement reports, that 120 terminal devices meet the measurement condition. If priorities of 60 terminal devices in the 120 terminal devices are higher than priorities of the other 60 terminal devices, the source satellite determines that the 60 terminal devices with higher priorities are the second batch of terminal devices, and the target satellite performs handover on the second batch of terminal devices. In other words, the measurement report reported once may determine a batch of terminal devices to be handed over.

It should also be noted that the part of terminal devices in the method 300 may be any batch of terminal devices in the plurality of batches of terminal devices in the method 400 to the method 700.

The foregoing describes in detail the handover method provided in the embodiments of this application with reference to FIG. 1 to FIG. 7. The following describes in detail a handover apparatus provided in the embodiments of this application with reference to FIG. 8 to FIG. 10.

Figure 8:
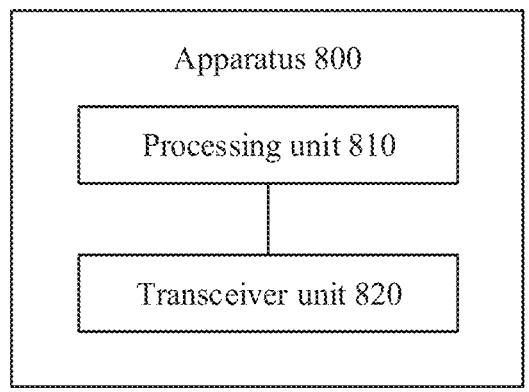
FIG. 8 is a schematic block diagram of a handover apparatus according to an embodiment of this application.

FIG. 8 is a schematic block diagram of a handover apparatus 800 according to an embodiment of this application. The apparatus 800 may correspond to the source satellite described in the foregoing method, or may correspond to a chip or component of the source satellite. Modules or units in the apparatus 800 may be separately configured to perform actions or processing processes performed by the source satellite in the foregoing method. As shown in FIG. 8, the handover apparatus 800 may include a processing unit 810 and a transceiver unit 820.

The processing unit 810 is configured to determine a part of terminal devices to be handed over in a plurality of terminal devices in a staring area of a first beam.

The transceiver unit 820 is configured to send a first handover request message to a target satellite, where the first handover request message includes contexts of the part of terminal devices.

The transceiver unit 820 is further configured to receive a handover instruction sent by the target satellite based on the first handover request message, and send the handover instruction to the part of terminal devices by using the first beam, where the handover instruction includes handover parameters used for handing over the part of terminal devices.

In an optional embodiment, the processing unit 810 is specifically configured to: determine, based on priority information, the part of terminal devices to be handed over in the plurality of terminal devices in the staring area, where the priority information is used to indicate handover priorities of the plurality of terminal devices in the staring area.

In an optional embodiment, the priority information is specifically used to indicate priorities of a plurality of sub-areas forming the staring area; and the processing unit 810 is specifically configured to determine, based on priorities that are of the plurality of sub-areas and that are indicated by the priority information, that terminal devices in a sub-area with a high priority in the plurality of sub-areas are the part of terminal devices.

In an optional embodiment, the transceiver unit 820 is further configured to: receive measurement reports sent by the plurality of terminal devices in the staring area; and the processing unit 810 is specifically configured to: determine, based on the measurement reports sent by the plurality of terminal devices in the staring area and the priority information, the part of terminal devices to be handed over in the staring area.

In an optional embodiment, the processing unit 810 is further configured to determine the priority information before determining, based on the priority information, the part of terminal devices to be handed over in the plurality of terminal devices in the staring area.

In an optional embodiment, the transceiver unit 820 is further configured to: receive the priority information sent by the target satellite, a core network element, or a management network element of a core network element.

In an optional embodiment, the processing unit 810 is further configured to: before determining the part of terminal devices to be handed over in the staring area of the first beam of the source satellite, classify the plurality of terminal devices in the staring area to obtain a plurality of batches of terminal devices, where a batch of terminal devices in the plurality of batches of terminal devices are the part of terminal devices.

It should be understood that, for a specific process in which units in the apparatus 800 perform the foregoing corresponding steps, refer to descriptions in the foregoing method embodiments. For brevity, details are not described herein again.

Figure 9:
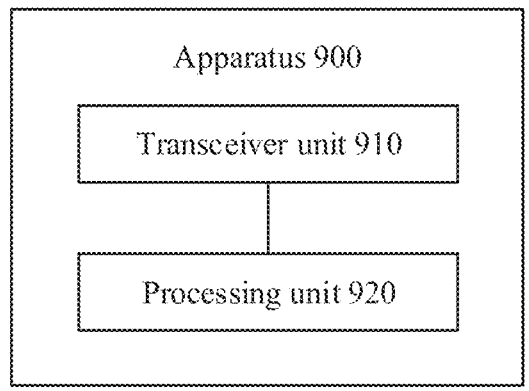
FIG. 9 is a schematic block diagram of another handover apparatus according to an embodiment of this application.

FIG. 9 is a schematic block diagram of a handover apparatus 900 according to an embodiment of this application. The apparatus 900 may correspond to the target satellite described in the foregoing method, or may correspond to a chip or component of the target satellite. Modules or units in the apparatus 900 may be separately configured to perform actions or processing processes performed by the target satellite in the foregoing method. As shown in FIG. 9, the handover apparatus 900 may include a transceiver unit 910 and a processing unit 920.

The transceiver unit 910 is configured to receive a first handover request message, where the first handover request message includes contexts of a part of terminal devices in a staring area of a first beam.

The processing unit 920 is configured to generate a handover instruction based on the first handover request message, where the handover instruction includes handover parameters used for handing over the part of terminal devices.

The transceiver unit 910 is further configured to send the handover instruction to the part of terminal devices by using the first beam of the source satellite.

In an optional embodiment, the processing unit 920 is further configured to: determine a second beam used for handover; after the handover instruction is sent to the part of terminal devices by using the first beam of the source satellite, hand over the part of terminal devices by using the second beam.

In an optional embodiment, the transceiver unit 910 is further configured to transmit data to the part of terminal devices by using the second beam after the part of terminal devices are handed over by using the second beam.

In an optional embodiment, the processing unit 920 is further configured to determine the priority information, where the priority information is used to indicate handover priorities of a plurality of terminal devices in the staring area; and the processing unit 920 is specifically configured to: determine, based on the priority information, the part of terminal devices to be handed over in the plurality of terminal devices in the staring area: and determine, based on geographical locations of the part of terminal devices, the second beam used for handover.

In an optional embodiment, the transceiver unit 910 is further configured to receive the priority information sent by the source satellite, a core network element, or a management network element of a core network element.

In an optional embodiment, the priority information is specifically used to indicate priorities of a plurality of sub-areas forming the staring area; and the processing unit 920 is specifically configured to: determine, based on priorities that are of the plurality of sub-areas and that are indicated by the priority information, that terminal devices in a sub-area with a high priority in the plurality of sub-areas are the part of terminal devices.

It should be understood that, for a specific process in which units in the apparatus 900 perform the foregoing corresponding steps, refer to descriptions in the foregoing method embodiments. For brevity, details are not described herein again.

The apparatus 800 in the foregoing solutions has a function of implementing corresponding steps performed by the source satellite in the foregoing method; the apparatus 900 in the foregoing solutions has a function of implementing corresponding steps performed by the target satellite in the foregoing method; and the function may be implemented by hardware or software, or may be implemented by hardware executing corresponding software. The hardware or the software includes one or more modules corresponding to the foregoing functions. For example, a sending unit may be replaced with a communications interface; a receiving unit may be replaced with a communications interface; and another unit, for example a determining unit, may be replaced with a processor, to separately perform a sending operation, a receiving operation, and a related processing operation in the method embodiments. In this embodiment of this application, a communications interface of an apparatus is used by the apparatus to communicate with another device. For example, the communications interface may be a transmitter, a receiver, a transceiver, a circuit, a bus, a module, a pin, or another type of communications interface. This is not limited in this embodiment of this application.

In a specific implementation process, the processor may be configured to perform, for example, but not limited to, baseband related processing, and the communications interface may be configured to perform, for example, but not limited to, information exchange. The foregoing components may be separately disposed on chips independent of each other, or at least a part or all of the components may be disposed on a same chip. For example, the processor may be further classified into an analog baseband processor and a digital baseband processor; and the analog baseband processor and the communications interface may be integrated on a same chip, and the digital baseband processor may be disposed on an independent chip. With continuous development of integrated circuit technologies, more components can be integrated into a same chip. For example, the digital baseband processor and a plurality of application processors (for example, but not limited to a graphics processing unit and a multimedia processor) may be integrated into a same chip. Such a chip may be referred to as a system on chip (SOC). Whether all the components are separately disposed on different chips or integrated and disposed on one or more chips usually depends on a specific requirement for a product design. A specific implementation of the components is not limited in the embodiments of this application.

Figure 10:
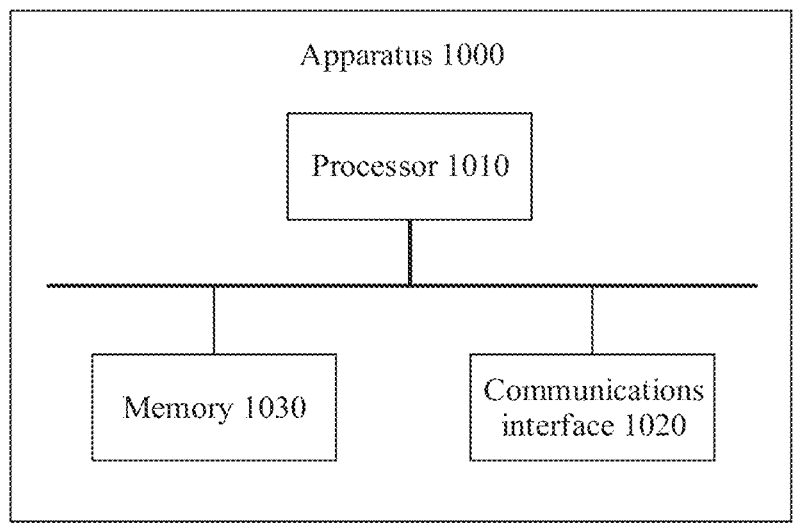
FIG. 10 is a schematic block diagram of still another handover apparatus according to an embodiment of this application.

It may be understood that the processor in the foregoing embodiments may execute program instructions by using a hardware platform having a processor and a communications interface, to separately implement a function of the processor in any design in the foregoing embodiments of this application. Based on this, as shown in FIG. 10, an embodiment of this application provides a schematic block diagram of a handover apparatus 1000. The apparatus 1000 includes a processor 1010, a communications interface 1020, and a memory 1030. The processor 1010, the communications interface 1020, and the memory 1030 are coupled to communicate with each other. The memory 1030 is configured to store instructions. The processor 1010 is configured to execute the instructions stored in the memory 1030, to control the communications interface 1020 to send a signal and/or to receive a signal. Coupling in this embodiment of this application is an indirect coupling or a communication connection between apparatuses, units, or modules, may be in an electrical form, a mechanical form, or another form, and is used for information exchange between the apparatuses, the units, or the modules.

In a possible implementation, if the apparatus 1000 is a source satellite, the processor 1010 is configured to determine a part of terminal devices to be handed over in a plurality of terminal devices in a staring area of a first beam; the communications interface 1020 is configured to send a first handover request message to a target satellite, where the first handover request message includes contexts of the part of terminal devices; and the communications interface 1020 is further configured to: receive a handover instruction sent by the target satellite based on the first handover request message, and send the handover instruction to the part of terminal devices by using the first beam, where the handover instruction includes handover parameters used for handing over the part of terminal devices.

In a possible implementation, if the apparatus 1000 is a target satellite, the communications interface 1020 is configured to receive a first handover request message, where the first handover request message includes contexts of a part of terminal devices in a staring area of a first beam; the processor 1010 is configured to generate a handover instruction based on the first handover request message, where the handover instruction includes handover parameters used for handing over the part of terminal devices; and the communications interface 1020 is further configured to send the handover instruction to the part of terminal devices by using the first beam of the source satellite.

It should be understood that the apparatus in FIG. 8 or the apparatus in FIG. 9 in the embodiments of this application may be implemented by the apparatus 1000 in FIG. 10, and may be configured to perform steps and/or procedures corresponding to the source satellite and the target satellite in the foregoing method embodiments.

It may be understood that the methods, the procedures, the operations, or the steps in the designs described in the embodiments of this application can be implemented in a one-to-one correspondence manner by computer software, electronic hardware, or a combination of computer software and electronic hardware. Whether these functions are performed by hardware or software depends on particular applications and design constraint conditions of the technical solutions. For example, in terms of good universality, low costs, and decoupling between software and hardware, program instructions may be executed to implement the functions. For another example, in terms of system performance and reliability, a dedicated circuit may be used to implement the functions. A person of ordinary skill in the art may use different methods to implement the described functions for each particular application. This is not limited herein.

According to the method provided in the embodiments of this application, this application further provides a computer program product. The computer program product includes computer program code. When the computer program code is run on a computer, the computer is enabled to perform the method in the foregoing embodiments. The embodiments in this application may alternatively be combined with each other.

According to the methods provided in the embodiments of this application, this application further provides a computer-readable medium. The computer-readable medium stores program code. When the program code is run on a computer, the computer is enabled to perform the method in the foregoing embodiments.

In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, any conventional processor, or the like.

It may be understood that the memory in the embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more preferred or more advantageous than another embodiment or design. To be specific, these terms are used to present a related concept in a specific manner.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or a part of the foregoing embodiments may be implemented by software, hardware, firmware, or any combination thereof. When the software is used to implement the embodiments, the embodiments may be implemented all or partially in a form of a computer program product. The computer program product may include one or more computer instructions. When the computer program instructions are loaded and executed on a computer, the procedures or functions according to the embodiments of this application are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in other manners. For example, the described apparatus embodiment is merely an example. For example, division into units is merely a logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces; and the indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
   determining a part of terminal devices to be handed over from among a plurality of terminal devices in a staring area of a first beam;
   sending a first handover request message to a target satellite, wherein the first handover request message comprises contexts of the part of terminal devices; and
   receiving a handover instruction sent by the target satellite based on the first handover request message, and sending the handover instruction to the part of terminal devices by using the first beam, wherein the handover instruction comprises handover parameters used for handing over the part of terminal devices.

2. The method according to claim 1, wherein determining the part of terminal devices to be handed over from among the plurality of terminal devices in the staring area of the first beam comprises:
   determining, based on priority information, the part of terminal devices to be handed over from among the plurality of terminal devices in the staring area, wherein the priority information is used to indicate handover priorities of the plurality of terminal devices in the staring area.

3. The method according to claim 2, wherein the priority information is used to indicate priorities of a plurality of sub-areas forming the staring area; and
   wherein determining, based on the priority information, the part of terminal devices to be handed over from among the plurality of terminal devices in the staring area comprises:
   determining, based on the priorities indicated by the priority information, that terminal devices in a sub-area having a high priority among the plurality of sub-areas are the part of terminal devices.

4. The method according to claim 2, wherein the method further comprises:
   receiving measurement reports sent by the plurality of terminal devices in the staring area; and
   wherein the determining, based on priority information, the part of terminal devices to be handed over from among the plurality of terminal devices in the staring area comprises:
   determining, based on the measurement reports sent by the plurality of terminal devices in the staring area and the priority information, the part of terminal devices to be handed over in the staring area.

5. The method according to claim 2, wherein before determining, based on priority information, the part of terminal devices to be handed over from among the plurality of terminal devices in the staring area, the method further comprises:
   determining the priority information.

6. The method according to claim 5, wherein determining the priority information comprises:
   receiving the priority information sent by the target satellite, a core network element, or a management network element of a core network element.

7. The method according to claim 1, wherein before determining the part of terminal devices to be handed over from among the plurality of terminal devices in the staring area of the first beam, the method further comprises:
   classifying the plurality of terminal devices in the staring area to obtain a plurality of batches of terminal devices, wherein a batch of terminal devices in the plurality of batches of terminal devices is the part of terminal devices.

8. A handover method, comprising:
   receiving a first handover request message, wherein the first handover request message comprises contexts of a part of terminal devices in a staring area of a first beam;
   generating a handover instruction based on the first handover request message, wherein the handover instruction comprises handover parameters used for handing over the part of terminal devices; and
   sending the handover instruction to the part of terminal devices by using the first beam of a source satellite.

9. The method according to claim 8, wherein the method further comprises:
   determining a second beam used for handover; and
   after sending the handover instruction to the part of terminal devices by using the first beam of the source satellite, the method further comprises:
   handing over the part of terminal devices by using the second beam.

10. The method according to claim 9, wherein after handing over the part of terminal devices by using the second beam, the method further comprises:

transmitting data to the part of terminal devices by using the second beam.

11. The method according to claim 9, wherein the method further comprises:
determining priority information, wherein the priority information is used to indicate handover priorities of a plurality of terminal devices in the staring area;
wherein determining the second beam used for handover comprises:
determining, based on the priority information, the part of terminal devices to be handed over from among the plurality of terminal devices in the staring area; and
determining, based on geographical locations of the part of terminal devices, the second beam used for handover.

12. The method according to claim 11, wherein determining the priority information comprises:
receiving the priority information sent by the source satellite, a core network element, or a management network element of a core network element.

13. The method according to claim 11, wherein the priority information is used to indicate priorities of a plurality of sub-areas forming the staring area;
wherein determining, based on priority information, the part of terminal devices to be handed over from among the plurality of terminal devices in the staring area comprises:
determining, based on the priorities indicated by the priority information, that terminal devices in a sub-area having a high priority among the plurality of sub-areas are the part of terminal devices.

14. A handover apparatus, comprising:
at least one processor;
at least one non-transitory memory coupled to the at least one processor and storing instructions for execution by the at least one processor, wherein the programming instructions instruct the at least one processor to: determine a part of terminal devices to be handed over from among a plurality of terminal devices in a staring area of a first beam;
send a first handover request message to a target satellite, wherein the first handover request message comprises contexts of the part of terminal devices; and
receive a handover instruction sent by the target satellite based on the first handover request message, and send the handover instruction to the part of terminal devices by using the first beam, wherein the handover instruction comprises handover parameters used for handing over the part of terminal devices.

15. The apparatus according to claim 14, wherein the programming instructions further instruct the at least one processor to:
determine, based on priority information, the part of terminal devices to be handed over from among the plurality of terminal devices in the staring area, wherein the priority information is used to indicate handover priorities of the plurality of terminal devices in the staring area.

16. The apparatus according to claim 15, wherein the priority information is used to indicate priorities of a plurality of sub-areas forming the staring area; and
wherein the programming instructions further instruct the at least one processor to:
determine, based on the priorities indicated by the priority information, that terminal devices in a sub-area having a high priority among the plurality of sub-areas are the part of terminal devices.

17. The apparatus according to claim 15, wherein the programming instructions further instruct the at least one processor to:
receive measurement reports sent by the plurality of terminal devices in the staring area; and
determine, based on the measurement reports sent by the plurality of terminal devices in the staring area and the priority information, the part of terminal devices to be handed over from among the plurality of terminal devices in the staring area.

18. The apparatus according to claim 15, wherein the programming instructions further instruct the at least one processor to:
determine the priority information before determining, based on the priority information, the part of terminal devices to be handed over from among the plurality of terminal devices in the staring area.

19. The apparatus according to claim 18, wherein the programming instructions further instruct the at least one processor to:
receive the priority information sent by the target satellite, a core network element, or a management network element of a core network element.

20. The apparatus according to claim 14, wherein the programming instructions further instruct the at least one processor to:
before determining the part of terminal devices to be handed over in the staring area of the first beam, classify the plurality of terminal devices in the staring area to obtain a plurality of batches of terminal devices, wherein a batch of terminal devices in the plurality of batches of terminal devices is the part of terminal devices.

* * * * *